United States Patent [19]

Zanow

[11] 4,304,397
[45] Dec. 8, 1981

[54] TWO-SHOE DRAFT GEAR

[75] Inventor: Andrey L. Zanow, Cleveland, Ohio

[73] Assignee: Midland-Ross Corporation, Cleveland, Ohio

[21] Appl. No.: 142,422

[22] Filed: Apr. 21, 1980

[51] Int. Cl.³ .............................................. F16F 7/08
[52] U.S. Cl. .................................. 267/9 A; 213/32 R
[58] Field of Search .............. 267/9 R, 9 A, 9 B, 9 C, 267/63 R, 138; 213/32 R, 32 A, 32 B, 32 C, 33, 34

[56] References Cited

U.S. PATENT DOCUMENTS

| 1,076,749 | 10/1913 | Courson | 267/9 A |
| 2,011,773 | 8/1935 | OConnor | 267/9 A |
| 2,229,442 | 1/1941 | Clark | 267/9 A |
| 2,549,036 | 4/1951 | Withall | 267/9 A |
| 2,764,300 | 9/1956 | Withall | 267/63 R X |
| 4,111,406 | 9/1978 | Zanow | 267/63 R X |

FOREIGN PATENT DOCUMENTS 531453  2/1955  Belgium ........................... 213/32 R Primary Examiner—George E. A. Halvosa
Attorney, Agent, or Firm—Harlan E. Hummer

[57] ABSTRACT

A draft gear is described as having rubber cushion pads and a friction clutch with a wedge and two friction shoes. The housing of the draft gear is provided with strategically located openings through which bars can be passed to neutralize the spring force of the cushion pads and facilitate assembly and disassembly of the draft gear. Further, an extra spring is provided to continuously load the wedge shoes to maintain them in frictional engagement with the wedge.

7 Claims, 5 Drawing Figures

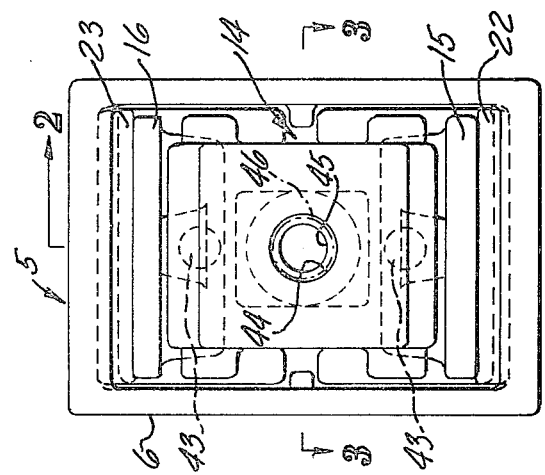
FIG. 1
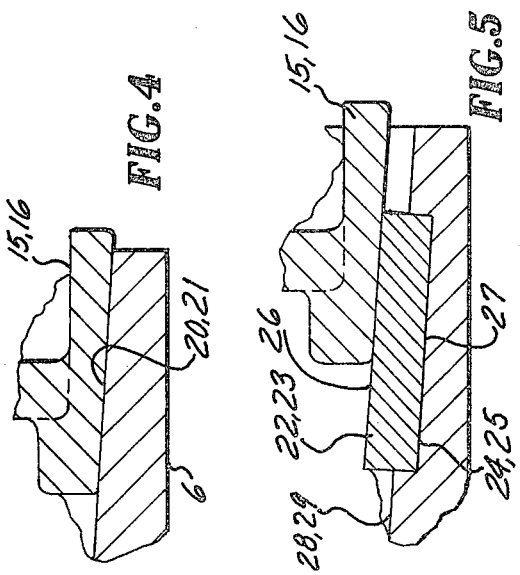
FIG. 4
FIG. 5
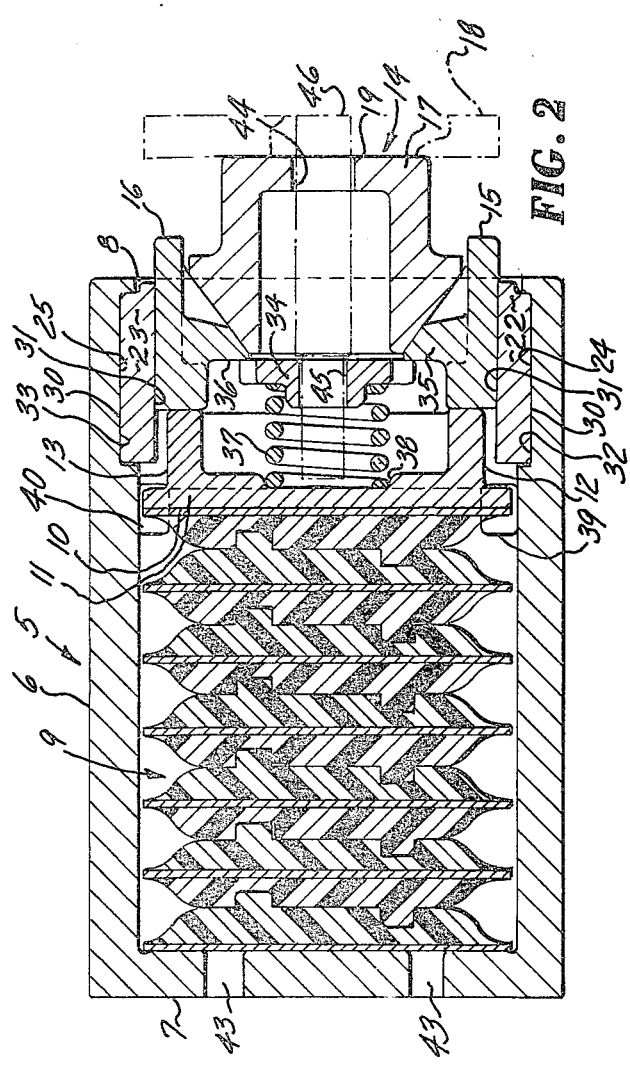
FIG. 2
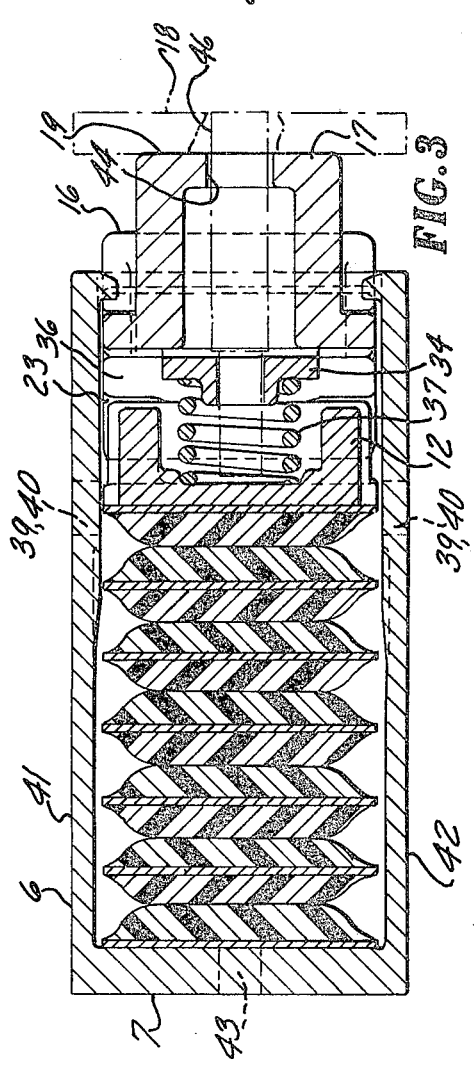
FIG. 3

TWO-SHOE DRAFT GEAR

BACKGROUND OF THE INVENTION

The invention is in an improvement in a friction railway draft gear as described, for example, in U.S. Pat. No. 2,764,300 which discloses a draft gear that employs rubber cushion pads and a friction clutch consisting of two friction shoes and a friction wedge for increasing the resistance or capacity of the draft gear. It is difficult to assemble a newly made draft gear of this type and to disassemble such draft gears when the friction clutch loses its operating effectiveness as, for example, the friction shoes become worn and fit loosely within the housing of the draft gear. The invention is designed to facilitate the assembly and disassembly of such draft gears.

Briefly stated, the invention is in a draft gear comprising, a housing in which is stacked a plurality of rubber cushion pads as described, for example, in U.S. Pat. Nos. 3,086,765 or 4,111,406, a spring seat for resting against the rubber cushion pads, and a friction clutch consisting of a pair of friction shoes for engaging the spring seat and a friction wedge for wedgingly engaging the friction shoes as force is applied thereagainst. The housing is provided with means by which the spring seat can be engaged and held in compressed relation against the cushion pads to permit easy insertion and removal of the friction clutch mechanism. Another aspect of the invention is the provision in the housing of means by which rubber cushion pads can be loosened and pushed from the housing. Still another aspect of the invention is the provision in the friction wedge of means by which the spring seat can be moved rearwardly in compressed relation against the rubber cushion pads. Still another aspect of the invention is the provision of means which continually coacts between the spring seat and friction shoes to load the shoes and maintain them in frictional engagement with the friction wedge.

DESCRIPTION OF THE DRAWING

The following description of the invention will be better understood by having reference to the accompanying drawing, wherein:

FIG. 1 is an end view of a draft gear made in accordance with the invention;

FIG. 2 is a section of the draft gear viewed from the line 2—2 of FIG. 1;

FIG. 3 is a section of the draft gear viewed from the line 3—3 of FIG. 1; and

FIGS. 4 and 5 are sections of the draft gear illustrating different types of bearing surfaces employed in the housing for sliding engagement with the friction shoes of the friction clutch.

DETAILED DESCRIPTION OF THE DRAWING

With reference to the drawing, there is shown a draft gear 5 that is utilized to absorb shocks or forces which are exerted longitudinally against a railroad car through a car coupler which is attached to the draft gear. The draft gear 5 comprises a housing 6 having a closed back end 7 in spaced longitudinal relation from an open front end 8, relative to the closeness of the attached car coupler. A number of similar rubber cushion pads 9 are stacked within the housing 6 against the closed back end 7 of the housing 6 in juxtaposed cushion abutting relation.

A spring seat 10 rests against the outermost rubber cushion pad 9 closest the open front end 8 of the housing 6. The spring seat 10, in this instance, comprises a generally flat plate 11 having an annular flange with at least two outstanding flange portions 12,13 which are designed to coact with a friction clutch 14 that is provided to increase the resistance capacity of the draft gear 5.

The friction clutch 14 comprises, (I) a pair of similar but oppositely shaped friction shoes 15,16 which are substantially equally spaced from the longitudinal axis of the draft gear 5 and abut the outstanding flange portions 12,13 of the spring seat 10, and (II) a friction wedge 17 which is centrally disposed of the draft gear 5 between the friction shoes 15,16 to wedgingly engage the friction shoes 15,16 and force them longitudinally and laterally of the draft gear 5 as a force, for example, is applied against the wedge 17 through a conventional front follower 18 which abuts the end 19 of the wedge 17 protruding from the open front end 8 of the housing 6. The friction clutch 14 is conventionally interlocked with the housing 6 to restrict movement of the friction shoes 15,16 and wedge 17 in a direction outwardly of the housing 6 so that the draft gear 5 will not readily come apart.

The housing 6, adjacent the open front end 8, as best seen in FIG. 4 and U.S. Pat. No. 2,764,300 is provided with a pair of similar permanent bearing surfaces 20,21 for engaging the friction shoes 15,16. This type of construction is cheaper from a cost standpoint, but undesirable in that, when the bearing surfaces 20,21 become sufficiently worn to adversely affect operation of the friction clutch 14, the housing 6 must be discarded. This problem, as best seen in FIGS. 2 and 5, is overcome by the provision of a pair of similar removable wearplates 22,23 that are positioned within matingly configured recesses 24,25 which are formed adjacent the open front end 8 of the housing 6. The wearplates 22,23 may be of different designs. For example, the wearplates 22,23 of FIG. 5 each have parallel bearing surfaces 26,27 because of the adjacent sloping surfaces 28,29 of the housing 6 in which the recesses 24,25 are formed, whereas the wearplates 22,23 of FIG. 2 have bearing surfaces 30,31 which converge in the direction of the open front end 8 of the housing 6, because of the flat, untapered surfaces 32,33 of the housing 6 in which the recesses 24,25 are formed. Thus, there has been described a basic two-shoe draft gear 5.

A circular spring washer 34 is centrally disposed of the draft gear 5 between the friction shoes 15,16 and the spring seat 10 and engages a pair of similar abutments 35,36 which are formed in the friction shoes 15,16 and lie in planes that are normal to the longitudinal axis of the draft gear 5. A coil spring 37 is placed between the spring washer 34 and the flat plate 11 of the spring seat 10 to continuously load the friction shoes 15,16 and keep them in frictional engagement with the friction wedge 17 to maintain the friction clutch 14 operable. The use of the spring washer 34 is preferred, rather than positioning the coil spring 37 directly between the spring seat 10 and friction shoes 15,16, because it provides greater support and stability for the coil spring 37 and permits the use of a coil spring 37 that has a higher spring capacity. The coil spring 37 rests in a circular recess 38 that is formed in the spring seat 10 and keeps the coil spring 37 in position between the spring seat 10 and spring washer 34.

Means, in the form of a pair of openings 39,40 in each of the opposing walls 41,42 of the housing 6 adjacent the plate 11 of the spring seat 10, are provided by which the outward force of the rubber cushion pads 9 in the direction of the open front end 8 of the housing 6, can be neutralized to permit easy insertion and removal of the friction clutch 14, when the draft gear 5 is being newly assembled or disassembled for the replacement of worn parts. The rubber cushion pads 9 sometimes become difficult to remove, by hand, from within the housing 6, because of the close fit between the pads 9 and housing 6. Means, in the form of a pair of similar openings 43 in the closed back end 7 of the housing 6, are provided by which the rubber cushion pads 9 can be readily loosened and pushed through the open front end 8 of the housing 6, after the friction clutch 14, wearplates 22,23 and spring seat 10 have been removed from the draft gear 5. Further, means in the form of axially aligned openings 44,45 in the friction wedge 17 and spring washer 34, are provided so that the rubber cushion pads 9 can be moved to a position where the spring force thereof can be neutralized.

The draft gear 5 is assembled by first stacking the rubber cushion pads 9 within the housing 6 against the back end 7 thereof. The spring seat 10 is then placed within the housing 6 against the outermost rubber cushion pad 9 and depressed towards the back end 7 until a pair of elongated bars can be inserted through the openings 39,40 in the walls 41,42 of the housing 6 to engage and hold the spring seat 10 in biased relation against the rubber cushion pads and in a predetermined position spaced from the open front end 8 of the housing 6 to neutralize the spring force thereof and permit easy insertion and placement of the remaining parts of the draft gear 5 within the housing 6, after which the bars are removed to load the draft gear 5.

The draft gear 5 is disassembled by inserting through the aligned openings 44,45 in the friction wedge 17 and spring washer 34, a special elongated bar 46 which is shaped to successively engage the spring washer 34 and spring seat 10 to depress the spring seat 10 to the point where the spring force of the rubber cushion pads can be neutralized as outlined above, and the smaller spring force of the coil spring 37 against the friction shoes 15,16 can be relieved to permit easy removal of the friction clutch 14. Bars can be inserted through the openings 43 in the back end 7 of the housing to loosen and free any rubber cushion pads 9 which become difficult to remove, by hand, from within the housing 6.

Thus, there has been described a highly improved two-shoe draft gear having means by which the draft gear can be readily assembled and then disassembled when the parts become worn to the point of replacement. There is also described a unique spring means by which the friction shoes can be maintained in frictional engagement with the friction wedge of the friction clutch.

What is claimed is:

1. A draft gear, comprising:
   (a) a housing having a longitudinal axis and an open front end in spaced relation from a closed back end;
   (b) a spring seat disposed within the housing between the ends thereof, the spring seat including a flat plate with a pair of opposing ends having adjacent thereto a pair of outstanding flange portions which extend from the flat plate in the direction of the open front end of the housing;
   (c) a plurality of rubber cushion pads stacked in cushion abutting relation within the housing between the flat plate of the spring seat and the back end of the housing, for exerting a spring force outwardly against the spring seat in the direction of the open front end of the housing;
   (d) a friction clutch coacting with the spring seat for increasing the resistance capacity of the draft gear to force applied thereagainst, the clutch having:
      (I) a pair of similarly, oppositely shaped friction shoes contacting the outstanding flange portions of the spring seat and extending therefrom in the direction of the open front end of the housing, the shoes having a pair of wedging surfaces which are substantially equally spaced from the longitudinal axis of the housing and which converge in the direction of the back end of the housing; and
      (II) a friction wedge disposed between the shoes in spaced relation from the spring seat and extending outwardly from the shoes and spring seat through the open end of the housing, the friction wedge including a pair of wedging surfaces which are matingly sloped to slidably engage the wedging surfaces of the shoes;
   (e) a pair of replaceable wearplates disposed between the shoes and adjacent sides of the housing, the wearplates including flat surfaces which slidably engage adjacent flat surfaces of the shoes in spaced lateral relation from the wedging surfaces of the shoes, relative to the longitudinal axis of the housing;
   (f) means coacting between the wearplates and housing for restricting movement of the wearplates in a direction longitudinally of the housing; and
   (g) means coacting between the housing and friction wedge for limiting axial movement of the wedge in a direction away from the housing;
   (h) a spring washer disposed between the friction wedge and spring seat and contacting the shoes in spaced relation inwardly from the points of contact of the flange portions of the spring seat with the shoes, relative to the longitudinal axis of the housing;
   (i) a coil spring positioned between the flat plate of the spring seat and the spring washer for forcing the washer against the shoes to provide a continuous spring load against the shoes;
   (j) aligned openings in the spring washer and friction wedge through which a bar can be passed to successively engage and move the spring washer and spring seat, respectively, longitudinally of the housing; and
   (k) at least one opening in the housing adjacent the spring seat through which a bar can be passed to engage and maintain the spring seat in compressed relation against the rubber friction pads to relieve the spring force of said pads against the friction clutch.

2. The draft gear of claim 1, which includes:
   (l) at least one opening in the back end of the housing through which a bar can be passed to engage and loosen rubber cushion pads which become stuck in the housing.

3. In combination, a draft gear comprising:

(a) a housing having a longitudinal axis and a generally open front end in spaced relation from a generally closed back end;

(b) a spring seat disposed within the housing in spaced relation from the front and back ends of the housing;

(c) first spring means disposed between the back end of the housing and spring seat for exerting a spring force against the spring seat in a direction outwardly away from the back end of the housing;

(d) a pair of friction shoes contacting the spring seat in spaced relation and extending outwardly therefrom in a direction away from the back end of the housing, the pair of shoes having a pair of sloping wedging surfaces which converge in the direction of the spring seat;

(e) a friction wedge positioned between the shoes in spaced relation from the spring seat, for wedgingly engaging the shoes to move the shoes longitudinally and laterally of the housing as a force, applied externally against the draft gear, causes relative movement of the wedge in the direction of the back end of the draft gear, the wedge having a pair of sloping wedging surfaces which converge in the direction of the spring seat and slidably engage the sloping wedging surfaces of the shoes;

(f) a spring washer disposed between the friction wedge and spring seat and contacting the shoes in spaced relation inwardly from the points of contact of the spring seat with the shoes, relative to the longitudinal axis of the housing;

(g) second spring means coacting between the spring seat and spring washer for forcing the spring washer against the shoes;

(h) a bar having at least two radially extending surfaces of different diameters; and (i) aligned openings in the spring washer and wedge through which said bar can be passed such that said bar surfaces can respectively and successively engage and move the spring washer and spring seat longitudinally of the housing towards the closed back end thereof.

4. The draft gear of claim 3 which includes:

(j) a pair of spaced openings in the housing adjacent the spring seat through which elongated bars can be passed for engaging the spring seat and holding the spring seat in a predetermined desired position spaced from the open front end of the housing.

5. The draft gear of claim 4, which includes:

(k) at least one opening in the back end of the housing through which an elongated bar can be passed for engaging, loosening, and pushing, if necessary, the spring means longitudinally of the housing.

6. The draft gear of claim 5, wherein the spring seat includes a flat plate with outstanding flange portions for engaging the shoes.

7. The draft gear of claim 6, wherein the first spring means includes a plurality of rubber cushion pads stacked within the housing in cushion abutting relation between the back end of the housing and the spring seat.

* * * * *